(12) United States Patent
Sakai

(10) Patent No.: US 7,614,212 B2
(45) Date of Patent: Nov. 10, 2009

(54) ENGINE CONTROL APPARATUS

(75) Inventor: Atsushi Sakai, Sapporo (JP)

(73) Assignee: Nissan Motor Co., Ltd., Yokohama (JP)

( * ) Notice: Subject to any disclaimer, the term of this patent is extended or adjusted under 35 U.S.C. 154(b) by 1185 days.

(21) Appl. No.: 10/326,070

(22) Filed: Dec. 23, 2002

(65) Prior Publication Data

US 2003/0136118 A1    Jul. 24, 2003

(30) Foreign Application Priority Data

Jan. 18, 2002    (JP) ............................. 2002-010667

(51) Int. Cl.
*F01N 3/00*    (2006.01)
(52) U.S. Cl. .............................. 60/285; 60/277; 60/302; 123/198 F; 123/481
(58) Field of Classification Search .................. 60/274, 60/276, 277, 285, 299, 302; 123/198 F, 481
See application file for complete search history.

(56) References Cited

U.S. PATENT DOCUMENTS

| | | | | |
|---|---|---|---|---|
| 4,134,261 A * | 1/1979 | Iizuka et al. | ................... | 60/276 |
| 5,444,974 A * | 8/1995 | Beck et al. | ..................... | 60/274 |
| 5,570,575 A * | 11/1996 | Sato et al. | ...................... | 60/277 |
| 5,586,432 A * | 12/1996 | Huemer et al. | ................ | 60/274 |
| 5,884,603 A * | 3/1999 | Matsuki | ..................... | 123/333 |
| 6,009,857 A * | 1/2000 | Hasler et al. | ................. | 123/481 |
| 6,336,320 B1 * | 1/2002 | Tanaka et al. | ................. | 60/285 |
| 6,405,527 B2 * | 6/2002 | Suzuki et al. | ................. | 60/285 |
| 6,408,618 B2 * | 6/2002 | Ide | .............. | 60/285 |
| 6,415,601 B1 * | 7/2002 | Glugla et al. | ................. | 60/284 |
| 6,729,120 B2 * | 5/2004 | Freisinger et al. | ............. | 60/274 |
| 6,732,506 B2 * | 5/2004 | Patterson et al. | ............. | 60/285 |

FOREIGN PATENT DOCUMENTS

JP    10-196433 A1    7/1998

* cited by examiner

*Primary Examiner*—Tu M Nguyen
(74) *Attorney, Agent, or Firm*—Global IP Counselors, LLP

(57) ABSTRACT

An engine control apparatus is configured to prevent damage to a catalytic converter caused by the occurrence of temperature differences. The engine control apparatus is particularly useful in a catalytic converter having a thin-walled ceramic carrier. The engine control apparatus prohibits cutting of the fuel supply during vehicle deceleration for a prescribed amount of time after operation of either an engine speed limiter component, which cuts the fuel supply when the engine speed exceeds an allowable engine speed, or a vehicle speed limiter component, which cuts the fuel supply when the vehicle speed exceeds an allowable vehicle speed.

17 Claims, 8 Drawing Sheets

ENGINE CONTROL APPARATUS

BACKGROUND OF THE INVENTION

1. Field of the Invention

The present invention relates to an engine control apparatus that minimizes damage to a catalyst in a catalytic converter arranged in an exhaust passage of an internal combustion engine. More specifically, the present invention relates to an engine control apparatus that controls the fuel flow to an internal combustion engine to minimize damage to a catalyst in a catalytic converter arranged in an exhaust passage of the internal combustion engine.

2. Background Information

During deceleration of an internal combustion engine for an automobile, it has generally been practiced to cut off the fuel supply to the engine in order to improve fuel economy. However, when the supply of fuel is cut off during deceleration, the air which is sucked into the combustion chambers of the engine is expelled to the exhaust passage, and the amount of oxygen supplied to a catalytic converter midway along the exhaust passage is increased. As a result, the oxidation reaction of the uncombusted fuel inside the catalytic converter increases sharply, which causes the catalyst temperature to rise sharply. This situation may entail degradation of the performance of the catalyst and deterioration of the catalyst bed.

In this connection, an engine control apparatus is disclosed in Japanese Laid-Open Patent Publication No. 10-196433 in which the engine control apparatus controls the fuel flow to an internal combustion engine to minimize early degradation of a catalyst in a catalytic converter arranged in an exhaust passage of the internal combustion engine. This Japanese publication discloses that early degradation of the catalyst may be prevented by prohibiting the cutting of fuel flow to the engine when the temperature of the catalyst is above a prescribed temperature. This fuel cutting operation is executed when the vehicle is decelerating or when the engine is in an over speed condition, during which times it is not necessary to supply fuel to the engine. This fuel cutting operation causes an oxygen-rich lean atmosphere to occur in the exhaust system. If the fuel supply is cut while the catalyst temperature is high, the atmosphere surrounding the catalyst will become a high-temperature lean atmosphere and the catalyst will degrade early. By prohibiting the fuel cutting operation when the catalyst temperature exceeds a prescribed temperature, the catalyst is prevented from being exposed to an oxygen-rich atmosphere while at a high temperature. Thus, the catalyst is prevented from early degradation in this Japanese publication due to exposure to an oxygen-rich atmosphere while at a high temperature.

In view of the above, it will be apparent to those skilled in the art upon reading this disclosure that there exists a need for an improved engine control apparatus that minimizes damage to a catalyst in a catalytic converter arranged in an exhaust passage of an internal combustion engine. This invention addresses this need in the art as well as other needs, which will become apparent to those skilled in the art from this disclosure.

SUMMARY OF THE INVENTION

It has been discovered that in addition to degradation of the catalyst caused by high temperatures as just described, heat shock damage to the catalyst is also caused by temperature differences occurring inside the catalyst, i.e., uneven temperature distribution within the catalyst.

More specifically, it has been discovered that when a speed limiter cuts the fuel flow to the engine to prevent engine over speed or to limit vehicle speed, the fuel injection operations and the fuel cutting operations are repeated alternately. This situation results in the exhaust gases being delivered to the catalyst alternately and instantaneously between rich and lean states. As a result, the temperature of the catalyst rises significantly. If the fuel supply is cut during vehicle deceleration after the temperature of the catalyst has risen significantly in this manner, the center portion of the catalyst will cool rapidly due to the large amount of airflow and a temperature difference will occur between the center portion of the catalyst and the peripheral portion of the catalyst. This temperature difference can lead to damage of the catalyst, e.g. early degradation.

In recent years, some catalytic converters have catalyst carriers that are made of ceramic and that are further made with thin walls in order to reduce the heat mass and enable early activation. It has been discovered that such thin-walled carriers are low in strength and have low durability against temperature differences. The present invention is especially designed in view of these problems with thin-walled ceramic catalyst carriers.

One object of the present invention is to provide an internal combustion engine control apparatus that minimizes damage to a catalyst in a catalytic converter arranged in an exhaust passage of an internal combustion engine. The present invention is especially designed in view of these problems with thin-walled ceramic catalyst carriers.

The present invention concerns an engine control apparatus that basically comprises a fuel cutting component, a deceleration fuel cutting component and a deceleration fuel cut prohibiting component. The fuel cutting component is configured to cut a fuel supply to an engine upon detecting at least one of a rotational engine speed of the engine exceeding an allowable rotational engine speed and a vehicle speed exceeding an allowable vehicle speed. The deceleration fuel cutting component is configured to cut the fuel supply upon detecting vehicle deceleration. The deceleration fuel cut prohibiting component is configured to prohibit the deceleration fuel cutting component from cutting the fuel supply to the engine during the vehicle deceleration for a prescribed period of time after operation of the fuel cutting component.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
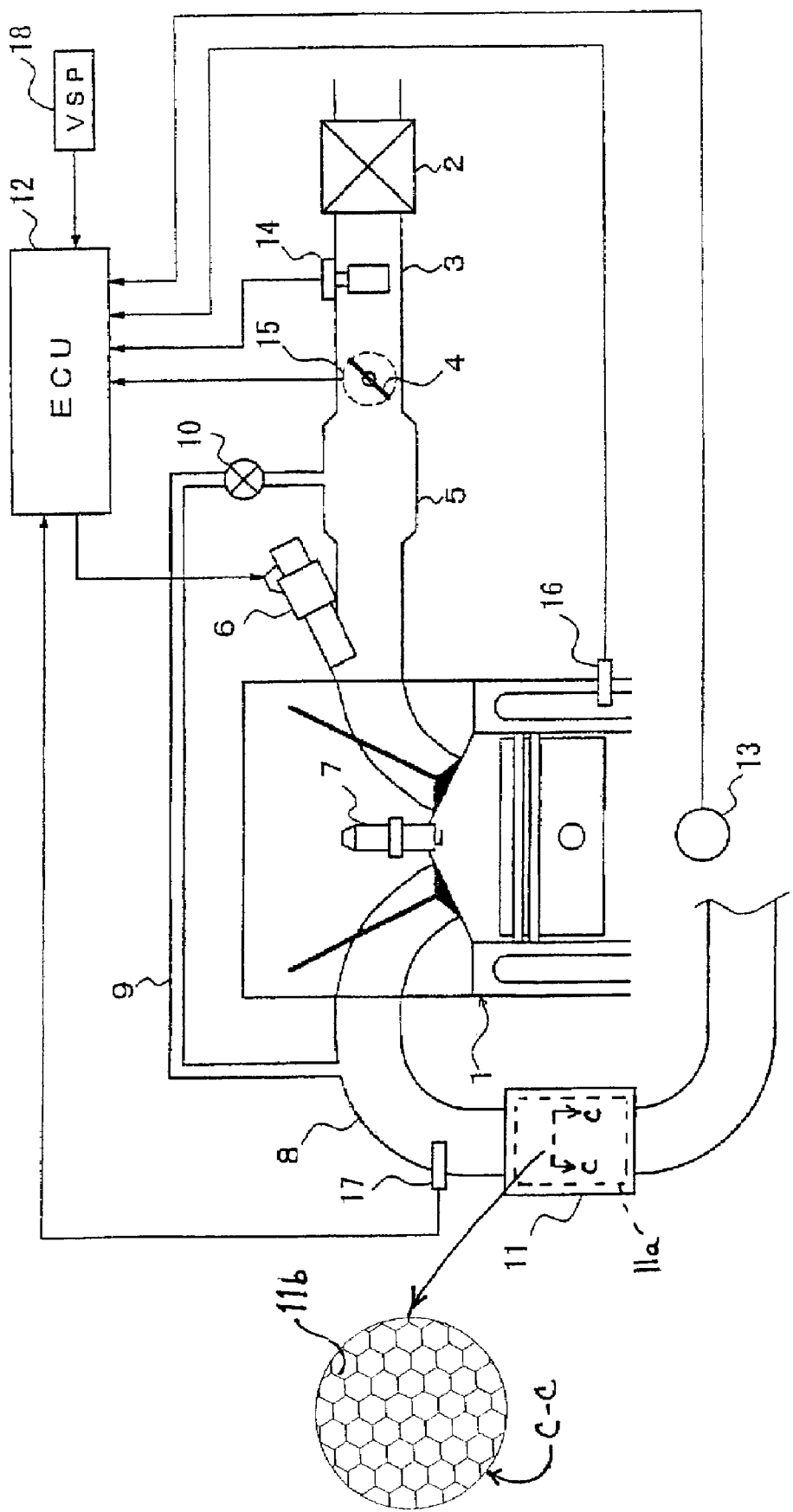
FIG. 1 is a schematic view of an engine control apparatus for an internal combustion engine in accordance with one embodiment of the present invention.

Referring initially to FIG. 1, an automobile engine system is illustrated with an engine control apparatus in accordance with one embodiment of the present invention. Air is introduced into the combustion chamber of each cylinder of a vehicle engine 1 through an air cleaner 2, an intake duct 3, a throttle valve 4, and an intake manifold 5. A fuel injection valve 6 is provided in each branch part of the intake manifold 5 such that there is a fuel injection valve 6 for each respective cylinder. The parts of the automobile engine system illustrated in FIG. 1 are generally conventional components that are well known in the art. Since the parts of the automobile engine system are well known in the art, these structures will not be discussed or illustrated in detail herein.

The fuel injection valves 6 are solenoid type fuel injection valves (injectors) that open when their solenoids are electrically energized and close when electric energizing stops. When the fuel injection valves 6 are energized and opened by means of a drive pulse signal from an engine control unit (ECU) or engine controller 12 (discussed later), they inject fuel that is pumped with a fuel pump (not shown) and regulated to a prescribed pressure by a pressure regulator. Therefore, the amount of fuel injected is controlled by the pulse width of the drive pulse signal.

A spark plug 7 is provided in each combustion chamber of the engine 1 and serves to spark ignite the air-fuel mixture and cause combustion.

The exhaust gas from each combustion chamber of the engine 1 is discharged through an exhaust manifold 8. Also, an EGR passage 9 that branches off the exhaust manifold 8 serves to recirculate a portion of the exhaust gas back to the intake manifold 5 via an EGR valve 10.

Meanwhile, a catalytic converter 11 is positioned in the exhaust passage directly below the exhaust manifold 8 and serves to clean the exhaust gas. The catalytic converter 11 comprises a catalyst supported on a ceramic carrier 11a having a honeycomb structure. The ceramic carrier is preferably thin walled, i.e., the thicknesses of the honeycomb-like partitions 11b are about 3 mils (i.e., 3×25.4/1000=0.076 mm) or less. More preferably, the thicknesses of these honeycomb-like partitions of the ceramic carrier are about 2 mils (i.e., 2×25.4/1000=0.051 mm).

The engine control apparatus of the present invention basically comprises a fuel cutting component, a deceleration fuel cutting component and a deceleration fuel cut prohibiting component. The fuel cutting component is configured to cut a fuel supply to the engine 1 upon detecting at least one of a rotational engine speed Ne of the engine 1 exceeding an allowable rotational engine speed Ne1 or Ne2 and a vehicle speed VSP exceeding an allowable vehicle speed VSP1 or VSP2. The deceleration fuel cutting component is configured to cut the fuel supply to the engine 1 upon detecting deceleration of the vehicle. The deceleration fuel cut prohibiting component is configured to prohibit the deceleration fuel cutting component from cutting the fuel supply to the engine 1 during the vehicle deceleration for a prescribed period of time (prescribed prohibition period) after operation of the fuel cutting component. This prescribed prohibition period minimizes damage to the catalyst in the catalytic converter 11. In particular, after the engine speed limiter component or the vehicle speed limiter component has operated, the temperature of the catalyst rises in a manner that does not occur during normal driving and large temperature differences can be induced if the fuel supply is cut while the vehicle is decelerating. Therefore, the engine control apparatus of the present invention prohibits the fuel cutting operation from occurring during deceleration for the prescribed amount of time (prescribed prohibition period) after the operation of either the engine speed limiter component or vehicle speed limiter component to prevent sectional cooling caused by air alone. Thus, the engine control apparatus prevents temperature differences from occurring. As a result, damage to the catalyst can be prevented. Moreover, as explained below, during normal driving (i.e., neither the engine speed limiter component nor vehicle speed limiter component has been recently operated), the fuel cutting operation is executed in the normal manner during vehicle deceleration because it is difficult for large temperature differences to occur inside the catalyst even when the exhaust temperature is high.

Preferably, the fuel cutting component of the present invention includes both the engine speed limiter component and the vehicle speed limiter component to control the fuel cutting operations. Alternatively, it will be apparent to those skilled in the art from this disclosure that the fuel cutting component of the present invention includes only the engine speed limiter component, or only the vehicle speed limiter component. The combination of steps S1 and S5 of the routine shown in FIG. 2 and the entire routine shown in FIG. 3 constitutes the engine speed limiter component in the illustrated embodiment. The combination of steps S2 and S5 of the routine shown in FIG. 2 and the entire routine shown in FIG. 4 constitutes the vehicle speed limiter component in the illustrated embodiment. The combination of steps S3 and S5 of the routine shown in FIG. 2 and the entire routine shown in FIG. 5 constitutes the deceleration fuel cut device or component in the illustrated embodiment. The combination of step S53 of the routine shown in FIG. 5 and the portion of the routine shown in FIG. 3 that is related to setting the deceleration F/C prohibition flag F1 constitutes the deceleration fuel cut prohibiting device or component that functions after operation of the engine speed limiter component in the illustrated embodiment. The combination of step S54 of the routine shown in FIG. 5 and the portion of the routine shown in FIG. 4 that is related to setting the deceleration F/C prohibition flag F2 constitutes the deceleration fuel cut prohibiting device or component that functions after operation of the vehicle speed limiter component device or component.

The engine control unit or controller 12 preferably includes a microcomputer with an engine control program that controls the operation of the fuel injection valves 6 to control the flow of fuel to the engine 1 as discussed below. The engine controller 12 can also include other conventional components such as central processing unit (CPU), an input interface circuit, an output interface circuit, an A/D converter and storage devices such as a ROM (Read Only Memory) device and a RAM (Random Access Memory) device. The engine controller 12 receives input signals from various sensors and controls the operation of the fuel injection valves 6 by the processing routines that are discussed below. The microcomputer of the engine controller 12 is programmed to control the processing routines. Thus, the engine controller 12 is operatively coupled to the various sensors and the fuel injection valves 6 in a conventional manner. The engine controller 12 is capable of selectively controlling any of the components of the control system in accordance with the control program, as needed and/or desired. It will be apparent to those skilled in the art from this disclosure that the precise structure and algorithms for the engine controller 12 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The aforementioned sensors include, but not limited to, the following sensors: a crank angle sensor 13, an airflow meter 14, a throttle sensor 15, a coolant temperature sensor 16, an air-fuel ratio sensor 17 and a vehicle speed sensor 18. The crank angle sensor 13 is configured and arranged to detect the crank angle and the engine speed (engine rotational speed) Ne based on the rotation of the crank shaft or cam shaft of the engine 1. The airflow meter 14 is configured and arranged to detect the intake airflow rate Qa inside the intake duct 3. The throttle sensor 15 (including an idle switch that turns ON when the throttle valve 4 is in the fully closed position) is configured and arranged to detect the degree of opening TVO of the throttle valve 4. The coolant temperature sensor 16 is configured and arranged to detect the coolant temperature Tw of the engine 1. The fuel ratio sensor 17 is configured and arranged to output a signal whose value is representative of the richness or leanness of the air-fuel ratio at the collector section of the exhaust manifold 8. The vehicle speed sensor 18 is configured and arranged to detect the vehicle speed VSP.

While receiving signals from the aforementioned sensors, the engine control unit or controller 12 uses the intake airflow rate Qa and the engine speed Ne to compute the basic fuel injection amount Tp, i.e., Tp=K Qa/Ne, where K is a constant. The engine controller 12 then applies various compensations to determine the final fuel injection amount Ti, i.e., Ti=Tp COEF $\alpha$, where COEF is a general compensation coefficient and $\alpha$ is the air-fuel ratio feedback compensation coefficient. Next, synchronizing with the engine rotation, the engine controller 12 sends a drive pulse signal whose pulse width corresponds to the final fuel injection amount Ti to each fuel injection valve 6 at a prescribed timing that depends on the respective cylinder.

Meanwhile, the engine controller 12 follows the routines shown in FIGS. 3 to 5 (discussed later) to determine if the conditions have been satisfied for cutting the fuel supply based on engine speed (engine speed limiter component), vehicle speed (vehicle speed limiter component), or deceleration. If the fuel cut command is issued (e.g., the engine speed limiter flag=1, the vehicle speed limiter flag=1, or the deceleration F/C flag=1), then the fuel supply to the engine 1 is cut by following the routine shown in FIG. 2 for stopping the output of the drive pulse signal to the fuel injection valves 6.

Figure 2:
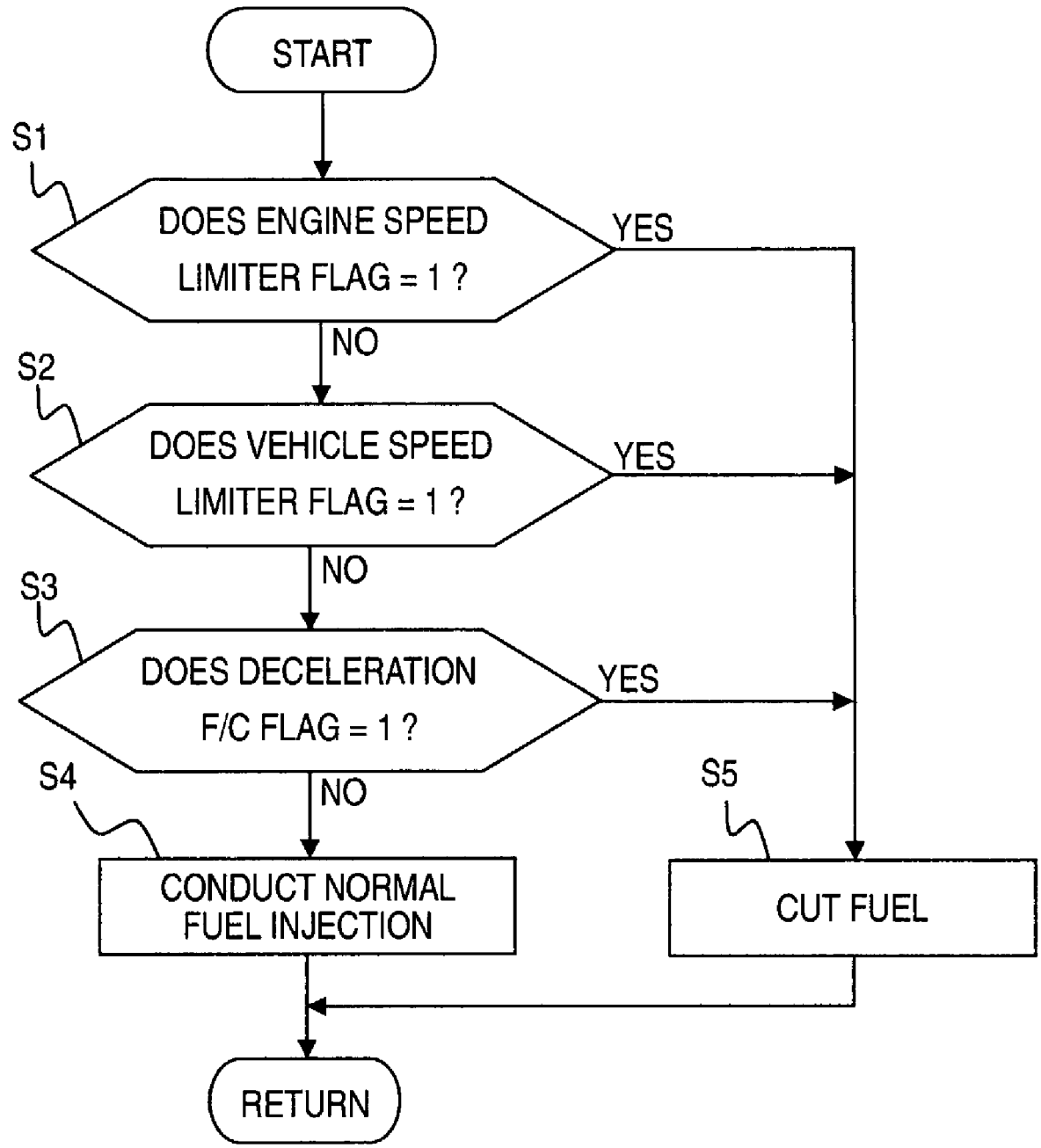
FIG. 2 is a flowchart showing a fuel injection control routine for the engine control apparatus in accordance with the embodiment of the present invention illustrated in FIG. 1.

The fuel injection control routine for the engine controller 12 is shown in FIG. 2 and will now be explained. In step S1, the engine controller 12 determines if the value of the engine speed limiter flag is 1. In step S2, the engine controller 12 determines if the value of the vehicle speed limiter flag is 1. In step S3, the engine controller 12 determines if the value of the deceleration F/C flag is 1. If all of the flags have a value of 0, then the engine controller 12 proceeds to step S4 and executes normal fuel injection. If any one of the flags has a value of 1, then the engine controller 12 proceeds to step S5 and executes a fuel cutting operation that stops the supply of the fuel to the fuel injection valves 6 or at least reduces the fuel being supplied to the engine 1.

Next, the method of setting the engine speed limiter flag, the vehicle speed limiter flag, and the deceleration F/C flag will be explained based on the flowcharts shown in FIGS. 3 to 5.

Figure 3:
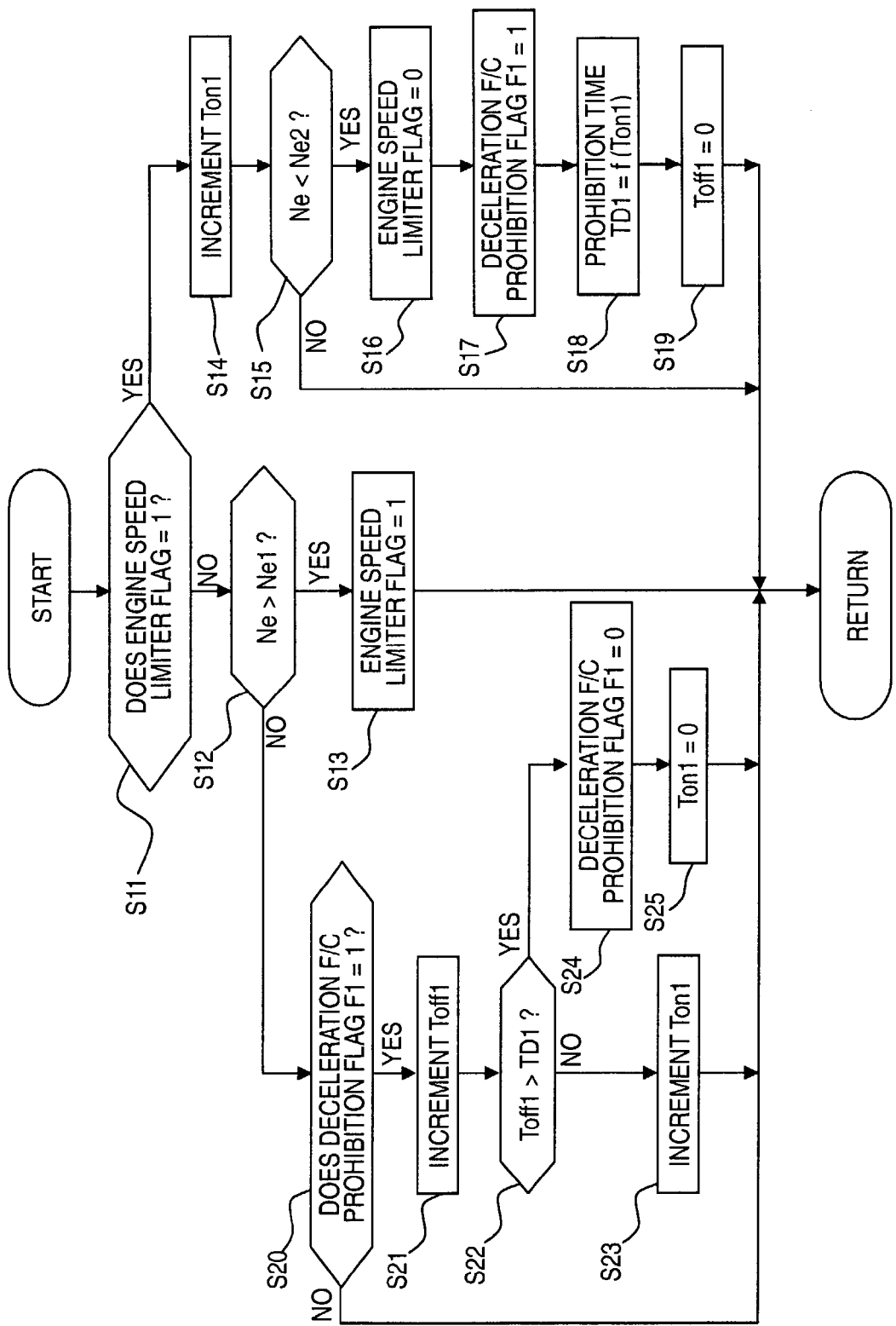
FIG. 3 is a flowchart showing an engine speed limiter control routine for the engine control apparatus in accordance with the embodiment of the present invention illustrated in FIG. 1.

FIG. 3 is a flowchart that shows the engine speed limiter control routine for the engine controller 12 in which the engine controller 12 uses a pair of timers to measure operation times Ton1 and Toff1 of the engine speed limiter control routine. This routine is repeated according to a prescribed time interval. The engine speed limiter component of the engine controller 12 control serves to prevent the engine 1 from entering an over speed condition in order to protect the engine 1.

In step S11, the engine controller 12 determines if the value of the engine speed limiter flag is 1, which would indicate that the engine speed limiter component of the engine controller 12 is cutting the fuel supply to the fuel injection valves 6. If the engine speed limiter flag is 0, then the engine controller 12 proceeds to step S12.

In step S12, the engine controller 12 detects the engine speed Ne and determines if the engine speed Ne is greater than a predetermined allowable engine speed Ne1. If "No", then the engine controller 12 proceeds to step S20. In step S20, so long as the value of the deceleration F/C prohibition flag F1 (discussed later) is 0, this cycle of the engine speed limiter control routine ends, i.e., the engine speed limiter control routine returns to the beginning of the routine where it stops further processing until after the prescribed time interval has elapsed for repeating the engine speed limiter control routine.

If the engine speed Ne exceeds the allowable engine speed Ne1, then the engine controller 12 proceeds from step S12 to step S13. The engine speed limiter flag is then set to 1, and the engine speed limiter control routine ends, i.e., the engine speed limiter control routine returns to the beginning of the routine where it stops further processing until after the prescribed time interval has elapsed for repeating the engine speed limiter control routine. Thus, this processing starts the fuel cutting operation in which the fuel supply to the engine 1 is cut by the engine speed limiter during the next execution of the engine speed limiter control routine. In other words, after the value of the engine speed limiter flag has been set to 1, the engine controller 12 proceeds to execute step S11 and step S14 in subsequent executions of the engine speed limiter control routine.

In step S14, the value of the engine speed limiter operation time Ton1 is incremented by the amount of time required to execute the routine in order to calculate the total amount of time the engine speed limiter has operated (i.e., the amount of time that the engine speed limiter control routine has been repeated).

Next, in step S15, the engine controller 12 detects the engine speed Ne and determines if this detected engine speed Ne is less than a predetermined allowable engine speed Ne2, which is set to be slightly lower than Ne1. If "No", the engine speed limiter control routine ends without further processing, i.e., the engine speed limiter control routine returns to the beginning of the routine where it stops further processing until after the prescribed time interval has elapsed for repeating the engine speed limiter control routine. This processing continues the cutting of the fuel supply to the engine 1 by the engine speed limiter component of the engine controller 12. In other words, the engine speed limiter flag maintains the value of 1 and the fuel cutting operation of the fuel supply continues.

If the engine speed Ne is less than the allowable engine speed Ne2, then the engine controller 12 proceeds from steps S15 and S16 to resume normal fuel injection operations. In step S16, the engine speed limiter flag is set to 0. As a result, the fuel cutting operation by the engine speed limiter component ends and fuel injection resumes.

In step S17, the deceleration F/C prohibition flag F1 is set to 1 in order to prohibit the fuel supply from being cut during any deceleration that occurs immediately after the end of the fuel cutting operation by the engine speed limiter component. In other words, in step S17, the present invention makes sure that fuel is supplied to each of the fuel injection valves 6 immediately after the end of the fuel cutting operation by the engine speed limiter component.

In step S18, the prohibition time TD1, which is the amount of time during which cutting of the fuel during deceleration will be prohibited, is set. The prohibition time TD1 is set in response to the value of the engine speed limiter operation time Ton1, which is the amount of time over which the engine speed limiter component has just been operated. In this preferred embodiment, the prohibition time TD1 is set to be proportionally increased in relation to the engine speed limiter operation time Ton1. In particular, the prohibition time TD1 is preferably set such that the prohibition time TD1 increases as the length of the engine speed limiter operation time Ton1 increases. It is also acceptable to design the routine such that the prohibition time TD1 is set to 0 when the engine speed limiter operation time Ton1 is less than a prescribed amount of time and only prohibit the deceleration fuel cutting operation when the engine speed limiter operation time Ton1 is greater than or equal to the prescribed amount of time.

In step S19, an elapsed time Toff1 is set to 0 in order to start a timer that measure the time elapsed since the fuel cutting operation by the engine speed limiter component has ended. Then, the engine speed limiter control routine ends, i.e., the engine speed limiter control routine returns to the beginning of the routine where it stops further processing until after the prescribed time interval has elapsed for repeating the engine speed limiter control routine.

After the engine speed limiter flag has been set to 0 (step S16) and the deceleration F/C prohibition flag F1 has been set to 1 (step S17), in subsequent repetitions of the engine speed limiter control routine, the engine controller 12 proceeds through steps S11, S12, and S20 to arrive at step S21.

In step S21, the value of the elapsed time Toff1 of the timer is incremented by the amount of time required to execute the engine speed limiter control routine in order to calculate the total amount of time elapsed since the fuel cutting operation by the engine speed limiter component has ended. In other words, the value of the elapsed time Toff1 is increase by a predetermined amount of time that equals the amount of time it takes to execute one cycle of the engine speed limiter control routine. Accordingly, the value of the elapsed time Toff1 indicates the total amount of time that has elapsed since the fuel cutting operation has ended by the engine speed limiter component. In other words, the value of the engine speed limiter operation time Toff1 is incremented by the amount of time it takes to execute the engine speed limiter control routine during the fuel cutting operation.

In step S22, the value of the elapsed time Toff1 of timer is compared with the value of the deceleration fuel cut prohibition time TD1. If the value of the elapsed time Toff1 is less than or equal to the value of the deceleration fuel cut prohibition time TD1 (i.e., if the prohibition time has not yet fully elapsed), the engine controller 12 proceeds to step S23 where the value of the engine speed limiter operation time Ton1 is incremented. Then, the engine speed limiter control routine ends, i.e., the engine speed limiter control routine returns to the beginning of the routine where it stops further processing until after the prescribed time interval has elapsed for repeating the engine speed limiter control routine. Under these conditions, the deceleration F/C prohibition flag F1 is held at a value of 1 and prohibition of the cutting operation of the fuel supply during deceleration continues. The value of the engine speed limiter operation time Ton1 is incremented in order to measure the operating time of the engine speed limiter component based on the number of repetitions of the routine. In other words, the value of the engine speed limiter operation time Ton1 is incremented by the amount of time it takes to execute the engine speed limiter control routine.

If the elapsed time Toff1 is greater than the deceleration fuel cut prohibition time TD1, i.e., if the amount of time elapsed since the fuel cutting operation has ended by the engine speed limiter component exceeds the deceleration fuel cut prohibition time TD1, then the engine controller 12 proceeds from step S22 to step S24, where the deceleration F/C prohibition flag F1 is set to 0. As a result, the fuel cutting operation of the fuel supply to the engine 1 during deceleration is now allowable. Next, the value of the engine speed limiter operation time Ton1 of the timer, which measures the total amount of time the engine speed limiter component has operated (i.e., the amount of time over which the routine has been repeated), is set to 0 in step S25 and the engine speed limiter routine ends, i.e., the engine speed limiter control routine returns to the beginning of the routine where it stops further processing until after the prescribed time interval has elapsed for repeating the engine speed limiter control routine.

Figure 4:
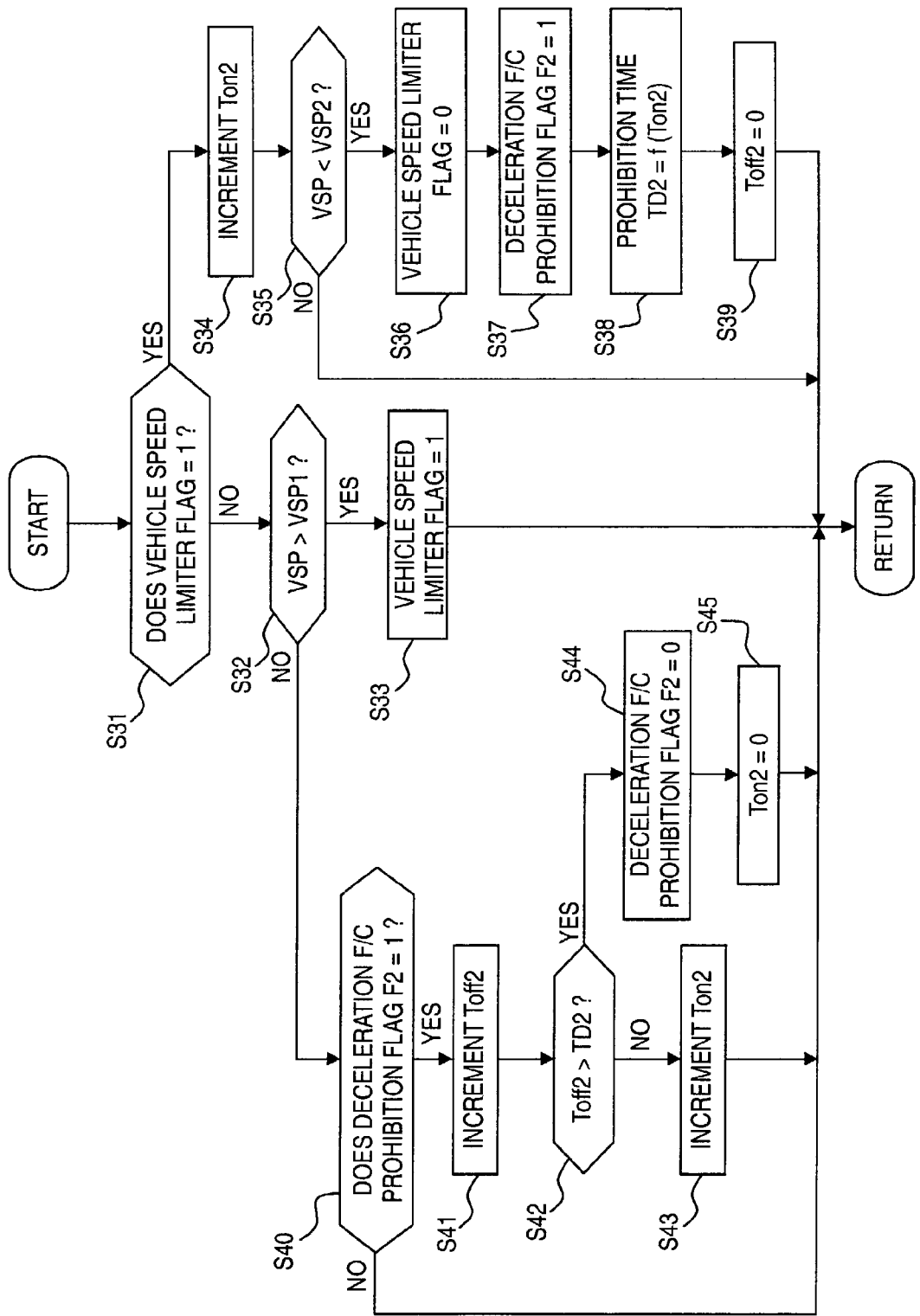
FIG. 4 is a flowchart showing a vehicle speed limiter control routine for the engine control apparatus in accordance with the embodiment of the present invention illustrated in FIG. 1.

FIG. 4 is a flowchart showing the vehicle speed limiter control routine in which the engine controller 12 uses a pair of timers to measure operation times Ton2 and Toff2 of the vehicle speed limiter control routine. This routine is repeated according to a prescribed time interval. The vehicle speed limiter control serves to operate the vehicle speed limiter component of the engine controller 12 in order to prevent the vehicle from traveling at high speeds.

In step S31, the engine controller 12 determines if the value of the vehicle speed limiter flag is 1, which would indicate that the vehicle speed limiter component is cutting the fuel supply. If the vehicle speed limiter flag is 0, the engine controller 12 proceeds to step S32.

In step S32, the engine controller 12 detects the vehicle speed VSP and determines if the vehicle speed is greater than a predetermined allowable vehicle speed VSP1. If "No", the engine controller 12 proceeds to step S40. In step S40, so long as the value of the deceleration F/C prohibition flag F2 (discussed later) is 0, this cycle of the vehicle speed limiter control routine ends without further processing, i.e., the vehicle speed limiter control routine returns to the beginning of the routine where it stops further processing until after the prescribed time interval has elapsed for repeating the vehicle speed limiter control routine.

If the vehicle speed VSP exceeds the allowable vehicle speed VSP1, the engine controller 12 then proceeds from step S32 to step S33. The vehicle speed limiter flag is then set to 1 in step S33 and the vehicle speed limiter control routine then ends, i.e., the vehicle speed limiter control routine returns to the beginning of the routine where it stops further processing until after the prescribed time interval has elapsed for repeating the vehicle speed limiter control routine. Thus, this processing starts the fuel cutting operation of the fuel supply by the vehicle speed limiter component during the next execution of the vehicle speed limiter control routine. In other words, after the value of the vehicle speed limiter flag has been set to 1, the engine controller 12 proceeds to execute step S31 and step S34 in subsequent executions of the vehicle speed limiter control routine.

In step S34, the value of the vehicle speed limiter operation time Ton2 is incremented by the amount of time required to execute the routine in order to calculate the total amount of time the vehicle speed limiter has operated (i.e., the amount of time the routine has been repeated).

Next, in step S35, the engine controller 12 detects the vehicle speed VSP and determines if the vehicle speed is less than a predetermined allowable vehicle speed VSP2 (slightly lower than VSP1). If "No", the vehicle speed limiter control routine ends without further processing, i.e., the vehicle speed limiter control routine returns to the beginning of the routine where it stops further processing until after the prescribed time interval has elapsed for repeating the vehicle speed limiter control routine. This processing continues the cutting of the fuel supply to the engine 1 by the vehicle speed limiter component of the engine controller 12. In other words, the vehicle speed limiter flag maintains the value of 1 and the fuel cutting operation of the fuel supply continues.

If the vehicle speed VSP is less than the allowable vehicle speed VSP2, then the engine controller 12 proceeds from steps S35 and S36 to resume normal fuel injection operations. In step S36, the vehicle speed limiter flag is set to 0. As a result, the fuel cutting operation by the vehicle speed limiter component ends and fuel injection resumes.

In step S37, the deceleration F/C prohibition flag F2 is set to 1 in order to prohibit the fuel supply from being cut during any deceleration that occurs immediately after the fuel cutting operation by the vehicle speed limiter component ends. In other words, in step S37, the present invention makes sure that fuel is supplied to each of the fuel injection valves 6 immediately after the end of the fuel cutting operation by the vehicle speed limiter component.

In step S38, the prohibition time TD2, which is the amount of time during which cutting of the fuel during deceleration will be prohibited, is set. The prohibition time TD2 is set in response to the value of the vehicle speed limiter operation time Ton2, which is the amount of time over which the vehicle speed limiter operated. In this preferred embodiment, the prohibition time TD2 is set to be proportionally increased in relation to the vehicle speed limiter operation time Ton2. In particular, the prohibition time TD2 is preferably set such that the prohibition time TD2 increases as the length of the vehicle speed limiter operation time Ton2 increases. It is also acceptable to design the routine such that the prohibition time TD2 is set to 0 when the vehicle speed limiter operation time Ton2 is less than a prescribed amount of time and only prohibit the deceleration fuel cutting operation when the vehicle speed limiter operation time Ton2 is greater than or equal to the prescribed amount of time.

In step S39, an elapsed time Toff2 is set to 0 in order to start measuring the time elapsed since the fuel cutting operation by the vehicle speed limiter ended. Then, the vehicle speed limiter control routine ends, i.e., the vehicle speed limiter control routine returns to the beginning of the routine where it stops further processing until after the prescribed time interval has elapsed for repeating the vehicle speed limiter control routine.

After the vehicle speed limiter flag has been set to 0 (step S36) and the deceleration F/C prohibition flag F2 has been set to 1 (step S37), in subsequent repetitions of the vehicle speed limiter control routine, the engine controller 12 proceeds through steps S31, S32, and S40 to arrive at step S41.

In step S41, the value of the elapsed time Toff2 is incremented by the amount of time required to execute the vehicle speed limiter control routine in order to calculate the total amount of time elapsed since the fuel cutting operation by the vehicle speed limiter component ended. In other words, the value of the elapsed time Toff2 is increase by a predetermined amount of time that equals the amount of time it takes to execute one cycle of the vehicle speed limiter control routine. Accordingly, the value of the elapsed time Toff2 indicates the total amount of time that has elapsed since the fuel cutting operation has ended by the vehicle speed limiter component. In other words, the value of the vehicle speed limiter operation time Toff2 is incremented by the amount of time it takes to execute the vehicle speed limiter control routine during the fuel cutting operation.

In step S42, the value of the elapsed time Toff2 is compared with the value of the deceleration fuel cut prohibition time TD2. If the value of the elapsed time Toff2 is less than or equal to the value of the deceleration fuel cut prohibition time TD2 (i.e., if the prohibition time has not yet fully elapsed), the engine controller 12 proceeds to step S43 where the value of the vehicle speed limiter operation time Ton2 is incremented. Then, the vehicle speed limiter control routine ends, i.e., the vehicle speed limiter control routine returns to the beginning of the routine where it stops further processing until after the prescribed time interval has elapsed for repeating the vehicle speed limiter control routine. Under these conditions, the deceleration F/C prohibition flag F2 is held at a value of 1 and prohibition of the cutting operation of the fuel supply during deceleration continues. The value of the vehicle speed limiter operation time Ton2 is incremented in order to measure the operating time of the vehicle speed limiter based on the number of repetitions of the routine. In other words, the value of the vehicle speed limiter operation time Ton2 is incremented by the amount of time it takes to execute the vehicle speed limiter control routine.

If the elapsed time Toff2 is greater than the deceleration fuel cut prohibition time TD2, i.e., if the amount of time elapsed since the fuel cutting operation has ended by the vehicle speed limiter component exceeds the deceleration fuel cut prohibition time TD2, then the engine controller 12 proceeds from step S42 to step S44, where the deceleration F/C prohibition flag F2 is set to 0. As a result, the fuel cutting operation of the fuel supply to the engine 1 during deceleration is now allowable. Next, the value of the vehicle speed limiter operation time Ton2, which measures the total amount of time the vehicle speed limiter has operated (i.e., the amount of time over which the routine has been repeated), is set to 0 in step S45 and the vehicle speed limiter routine ends, i.e., the vehicle speed limiter control routine returns to the beginning of the routine where it stops further processing until after the prescribed time interval has elapsed for repeating the vehicle speed limiter control routine.

Figure 5:
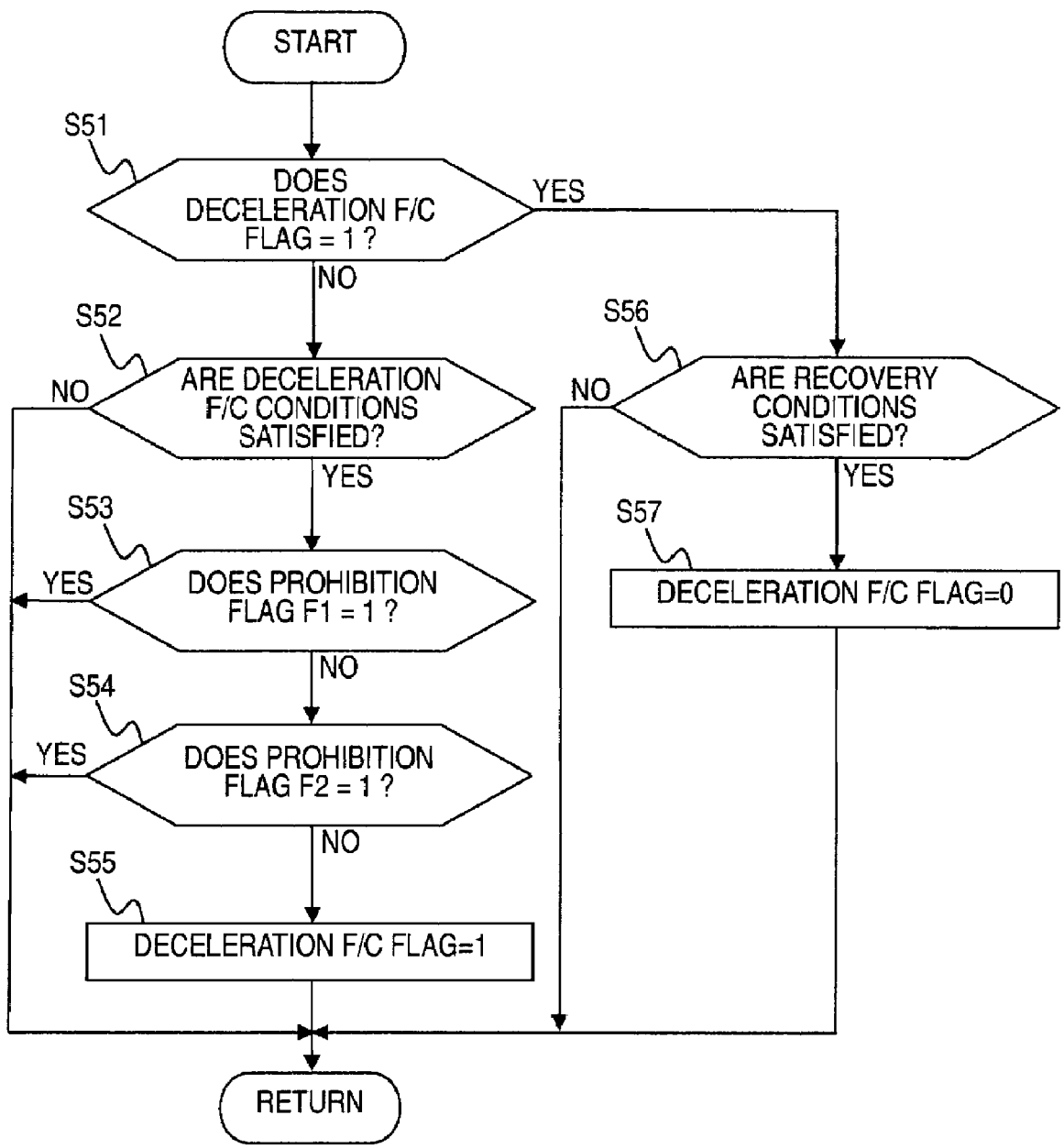
FIG. 5 is a flowchart showing a deceleration fuel cut control routine for the engine control apparatus in accordance with the embodiment of the present invention illustrated in FIG. 1.

FIG. 5 is a flowchart showing the deceleration fuel cut control routine. This routine is repeated according to a prescribed time interval. The deceleration fuel cut control routine ensures that the fuel supply is not cut during vehicle decelerate if there is the risk that cutting the fuel will cause temperature differences in the catalyst which may damage the catalyst.

In step S51, the engine controller 12 determines if the value of the deceleration F/C flag is 1, which would indicate that the fuel supply is being cut during deceleration. If the value of the deceleration F/C flag is 0, then the engine controller 12 proceeds to step S52.

In step S52, the engine controller 12 determines if the conditions (deceleration F/C conditions) are satisfied for performing a deceleration fuel cutting operation, or not satisfied for continuing with normal deceleration fuel injecting operations. More specifically, the deceleration F/C conditions are determined to be satisfied when the vehicle is decelerating and the engine speed Ne is greater than or equal to a prescribed engine speed. In this embodiment, the deceleration F/C conditions are determined to be satisfied when an idle switch is ON (throttle valve fully closed), the engine speed Ne is greater than or equal to a prescribed fuel cut engine speed Nfc, and the vehicle speed VSP is greater than or equal to a prescribed value.

If the deceleration F/C conditions are not satisfied in step S52, the deceleration fuel cut control routine ends, i.e., the deceleration fuel cut control routine returns to the beginning of the routine where it stops further processing until after the prescribed time interval has elapsed for repeating the deceleration fuel cut control routine. If the deceleration F/C conditions are satisfied, then the engine controller 12 proceeds to steps S53 and S54, where the engine controller 12 determines the engine speed limiter component and/or the vehicle speed limiter component has just been operated.

In step S53, the engine controller 12 determines if the value of the deceleration F/C prohibition flag F1 is 1. If the deceleration F/C prohibition flag F1 is 1, then the fuel cutting operation during vehicle deceleration is being prohibited for a prescribed amount of time after operation of the engine speed limiter component and the deceleration fuel cut control routine ends. In other words, the fuel supply is not cut even if the vehicle decelerates because there is the risk that cutting the fuel will cause temperature differences in the catalyst which may damage the catalyst.

In step S54, the engine controller 12 determines if the value of the deceleration F/C prohibition flag F2 is 1. If deceleration F/C prohibition flag F2 is 1, then the fuel cutting operation during deceleration is being prohibited for a prescribed amount of time after operation of the vehicle speed limiter component and the deceleration fuel cut control routine ends. In other words, the fuel supply is not cut even if the vehicle decelerates because there is the risk that the fuel cutting operation of cutting the fuel to the engine 1 will cause temperature differences in the catalyst which may damage the catalyst.

Meanwhile, the engine controller 12 proceed to step S55 if the normal deceleration F/C conditions are satisfied and the values of both the deceleration F/C prohibition flag F1 and the deceleration F/C prohibition flag F2 are 0.

In step S55, the deceleration F/C flag is set to 1 so as to execute a deceleration fuel cutting operation. As a result, the deceleration fuel cutting operation starts. After the deceleration fuel cutting operation starts, the deceleration fuel cut control routine returns to the beginning of the routine where it stops further processing until after the prescribed time interval has elapsed for repeating the deceleration fuel cut control routine. Since the value of the deceleration F/C flag is now set to 1, control proceeds from step S51 to step S56.

In step S56, the engine controller 12 determines if the fuel cut recover conditions are satisfied to stop the deceleration fuel cutting operation. More specifically, the fuel cut recovery conditions are satisfied when the idle switch is OFF (accelerator pedal depressed) and the engine speed Ne is less than or equal to a prescribed recovery engine speed Nrc.

If the recovery conditions are not satisfied, then the deceleration fuel cutting operation continues by the deceleration fuel cut control routine returning to the beginning of the routine where it stops further processing for the prescribed time interval before repeating the deceleration fuel cut control routine.

If the recovery conditions are satisfied, the engine controller 12 proceeds to step S57. In step S57, the deceleration F/C flag is set to 0 to stop the deceleration fuel cutting operation. As a result, the deceleration fuel cutting operation ends and normal fuel injection operations resume. Then, the deceleration fuel control routine ends, i.e., the deceleration fuel cut control routine returns to the beginning of the routine where it stops further processing until after the prescribed time interval has elapsed for repeating the deceleration fuel cut control routine.

Figure 6:
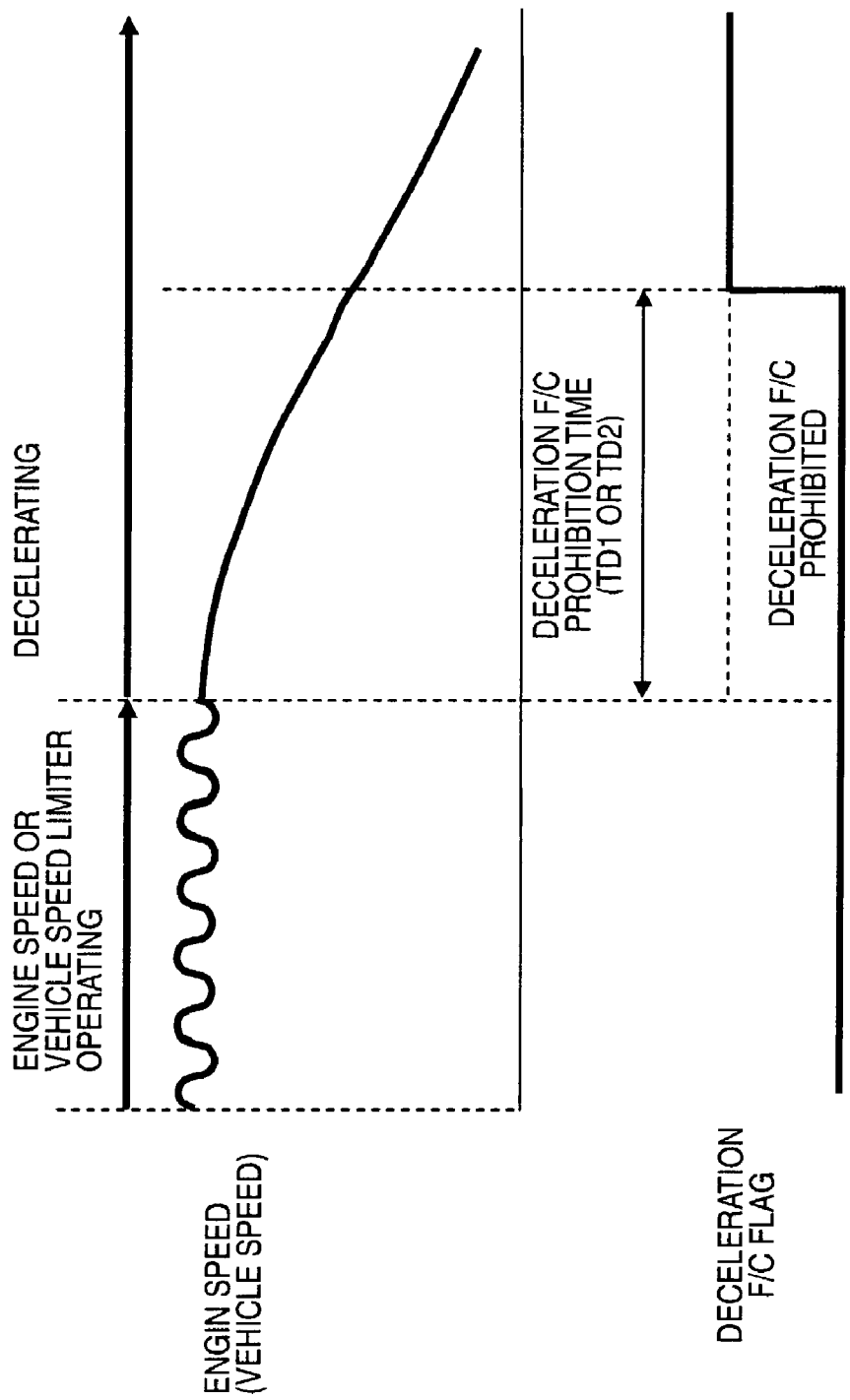
FIG. 6 is a time chart for the control executed by for the engine control apparatus in accordance with the embodiment of the present invention illustrated in FIG. 1.

FIG. 6 is a time chart for the control operations that were described above. After the engine speed limiter component or the vehicle speed limiter component operates, the fuel cutting operation of the fuel supply to the engine 1 is prohibited during the prescribed time TD1 or TD2 even if the vehicle starts to decelerate.

Figure 7:
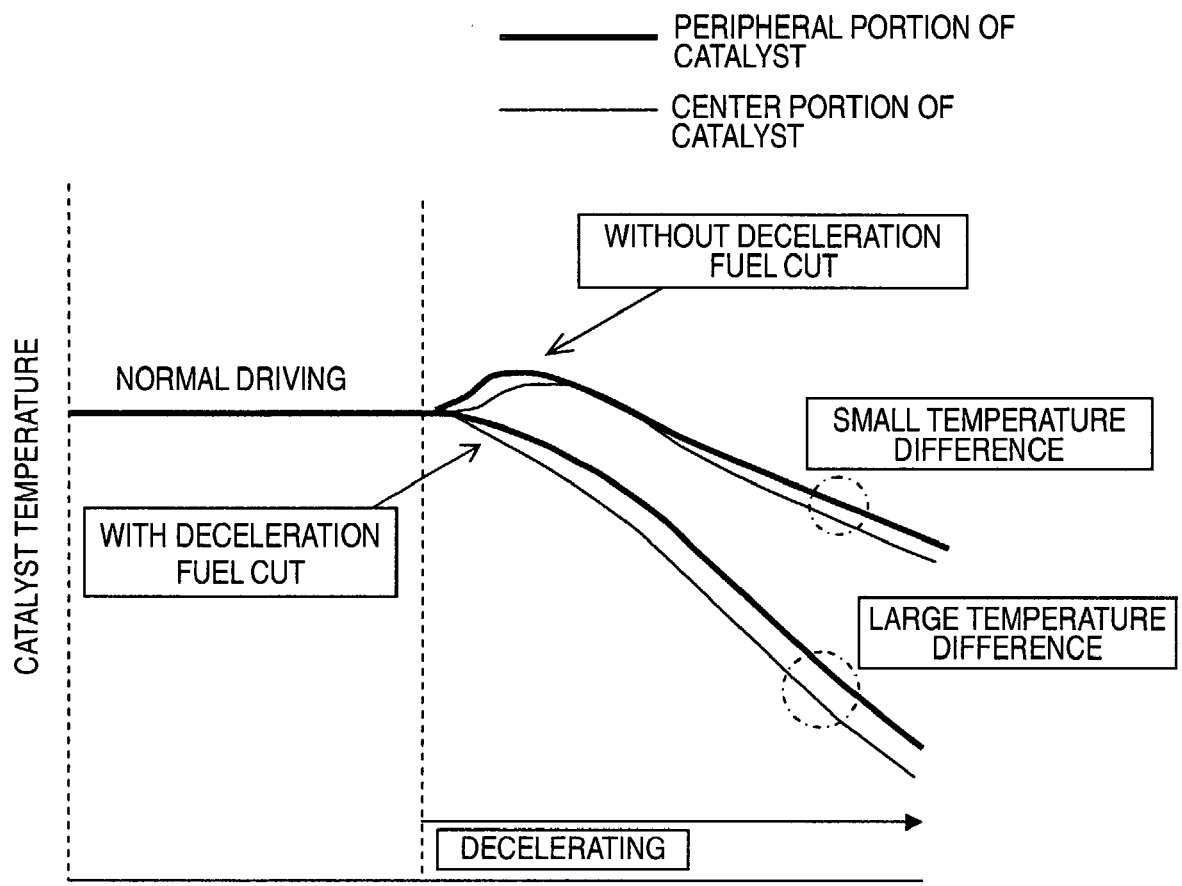
FIG. 7 is a graph diagrammatically illustrating how the catalyst temperature changes during deceleration after normal driving.

FIG. 7 shows how the catalyst temperature changes when the vehicle decelerates after normal travel, i.e., neither the engine speed limiter component nor the vehicle speed limiter component was recently operated to perform a fuel cutting operation. In particular, FIG. 7 illustrates the temperature difference that occurs between the center portion of the catalyst and the peripheral portion of the catalyst. The temperature difference between the center portion of the catalyst and the peripheral portion of the catalyst does not become very large when the fuel supply is cut during vehicle deceleration. In other words, during normal driving, cutting the fuel supply to the engine is executed in the normal manner upon the vehicle deceleration because it is difficult for large temperature differences to occur inside the catalyst even when the exhaust temperature is high.

Figure 8:
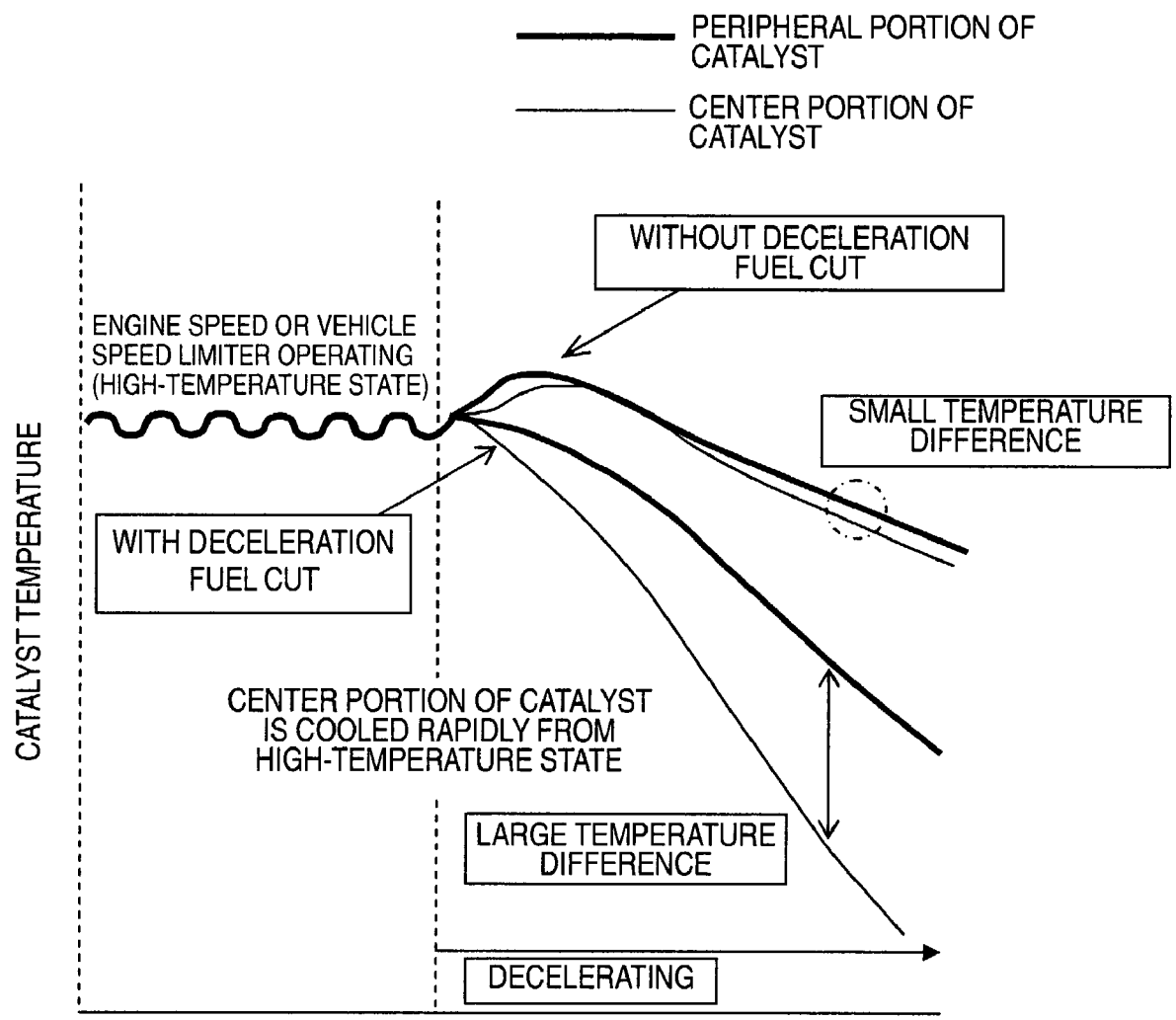
FIG. 8 is a graph diagrammatically illustrating how the catalyst temperature changes during deceleration after the engine speed limiter component or the vehicle speed limiter component operates in accordance with the embodiment of the present invention illustrated in FIG. 1.

FIG. 8 shows how the catalyst temperature changes when the vehicle decelerates after operating the engine speed limiter component or the vehicle speed limiter component to perform a fuel cutting operation. In particular, FIG. 8 illustrates that although the catalyst temperature decreases more when the fuel supply is cut during vehicle deceleration than when the fuel supply is not cut, the temperature difference between the center portion of the catalyst and the peripheral portion of the catalyst becomes large when the fuel supply is cut. This large temperature difference between the center portion of the catalyst and the peripheral portion of the catalyst occurs because at the center portion and other portions of the catalyst there is more airflow which causes these portions to cool more rapidly. Consequently, when the catalyst temperature is abnormally high after operation of the engine speed limiter component or the vehicle speed limiter component, sectional cooling by air alone is prevented by prohibiting the cutting operation of the fuel supply during deceleration. As a result, large temperature differences do not occur and catalyst damage can be prevented.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-010667. The entire disclosure of Japanese Patent Application No. 2002-010667 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine control apparatus comprising:
a fuel cutting component including an engine speed limiter component configured to cut a fuel supply to an engine upon detecting a rotational engine speed of the engine exceeding an allowable rotational engine speed;
a deceleration fuel cutting component configured to cut the fuel supply upon detecting vehicle deceleration; and
a deceleration fuel cut prohibiting component configured to prohibit the deceleration fuel cutting component from cutting the fuel supply to the engine during the vehicle deceleration for a prescribed period of time after operation of the fuel cutting component, wherein
the prescribed period of time during which cutting of the fuel supply during the vehicle deceleration is prohibited is set in response to an amount of time over which the engine speed limiter component is operated.

2. The engine control apparatus as recited in claim 1, wherein
the deceleration fuel cut prohibiting component is configured to only prohibit cutting of the fuel supply during the vehicle deceleration when the amount of time over which the engine speed limiter component operated is greater than or equal to a prescribed value.

3. An engine control apparatus comprising:
a fuel cutting component including a vehicle speed limiter component configured to cut a fuel supply to an engine upon detecting a vehicle speed exceeding an allowable vehicle speed;
a deceleration fuel cutting component configured to cut the fuel supply upon detecting vehicle deceleration; and
a deceleration fuel cut prohibiting component configured to prohibit the deceleration fuel cutting component from cutting the fuel supply to the engine during the vehicle deceleration for a prescribed period of time after operation of the tel cutting component, wherein
the prescribed period of time during which cutting of the fuel supply during vehicle deceleration is prohibited is set in response to an amount of time over which the vehicle speed limiter component is operated.

4. The engine control apparatus as recited in claim 3, wherein
the deceleration fuel cut prohibiting component is configured to only cutting of the fuel supply during vehicle deceleration when the amount of time over which the vehicle speed limiter component operated is greater than or equal to a prescribed value.

5. An internal combustion engine having the engine control apparatus as recited in claim 3, comprising:
a combustion chamber; and
a catalytic converter arranged in an exhaust passage extending from the combustion chamber.

6. An internal combustion engine comprising:
a combustion chamber;
a catalytic converter arranged in an exhaust passage extending from the combustion chamber; and
an engine control apparatus comprising
a fuel cutting component including an engine speed limiter component configured to cut a fuel supply to the engine upon detecting a rotational engine speed of the engine exceeding an allowable rotational engine speed;
a deceleration fuel cutting component configured to cut the fuel supply upon detecting vehicle deceleration; and
a deceleration fuel cut prohibiting component configured to prohibit the deceleration fuel cutting component from cutting the fuel supply to the engine during the vehicle deceleration for a prescribed period of time after operation of the fuel cutting component, wherein
the prescribed period of time during which cutting of the fuel supply during the vehicle deceleration is prohibited is set in response to an amount of time over which the engine speed limiter component is operated.

7. The internal combustion engine as recited in claim 6, wherein the catalytic converter is ranged directly under an exhaust manifold.

8. The internal combustion engine as recited in claim 6, wherein the catalytic converter includes a ceramic carrier.

9. The internal combustion engine as recited in claim 8, wherein
the ceramic carrier is a thin walled carrier having a wall thickness of about 0.076 mm or less.

10. An engine control apparatus comprising:
fuel cutting means for cutting a fuel supply to an engine upon detecting a rotational engine speed of the engine exceeding an allowable rotational engine speed;
a deceleration fuel cutting means for cutting the fuel supply upon detecting vehicle deceleration; and
a deceleration fuel cut prohibiting means for prohibiting the deceleration fuel cutting means from cutting the fuel supply to the engine during the vehicle deceleration for a prescribed period of time after operation of the fuel cutting means, wherein
the prescribed period of time during which cutting of the fuel supply during the vehicle deceleration is prohibited is set in response to an amount of time over which the fuel cutting means is operated.

11. An engine control apparatus comprising:
fuel cutting means for cutting a fuel supply to an engine upon detecting a vehicle speed exceeding an allowable vehicle speed;
deceleration fuel cutting means for cutting the fuel supply upon detecting vehicle deceleration; and
deceleration fuel cut prohibiting means for prohibiting the deceleration fuel cutting means from cutting the fuel supply to the engine during the vehicle deceleration for a prescribed period of time after operation of the fuel cutting means, wherein the prescribed period of time during which cutting of the fuel supply during vehicle deceleration is prohibited is set in response to an amount of time over which the fuel cutting means is operated.

12. An engine control apparatus comprising:

a fuel cutting component including an engine speed limiter component configured to cut a fuel supply to an engine upon detecting a rotational engine speed of the engine exceeding an allowable rotational engine speed;

a deceleration fuel cutting component configured to cut the fuel supply upon detecting vehicle deceleration; and a deceleration fuel cut prohibiting component configured to prohibit the deceleration fuel cutting component from cutting the fuel supply to the engine during the vehicle deceleration for a prescribed period of time after operation of the fuel cutting component, wherein the deceleration fuel cut prohibiting component is configured to only prohibit cutting of the fuel supply during the vehicle deceleration when an amount of time over which the engine speed limiter component operated is greater than or equal to a prescribed value.

13. An internal combustion engine having the engine control apparatus as recited in claim 12, comprising:

a combustion chamber; and a catalytic converter arranged in an exhaust passage extending from the combustion chamber.

14. An engine control apparatus comprising:

a fuel cutting component including a vehicle speed limiter component configured to cut a fuel supply to an engine upon detecting a vehicle speed exceeding an allowable vehicle speed;

a deceleration fuel cutting component configured to cut the fuel supply upon detecting vehicle deceleration; and a deceleration fuel cut prohibiting component configured to prohibit the deceleration fuel cutting component from cutting the fuel supply to the engine during the vehicle deceleration for a prescribed period of time after operation of the fuel cutting component, wherein the deceleration fuel cut prohibiting component is configured to only prohibit cutting of the fuel supply during vehicle deceleration when an amount of time over which the vehicle speed limiter component operated is greater than or equal to a prescribed value.

15. An internal combustion engine having the engine control apparatus as recited in claim 14, comprising:

a combustion chamber; and a catalytic converter arranged in an exhaust passage extending from the combustion chamber.

16. An engine control apparatus comprising:

fuel cutting means for cutting a fuel supply to an engine upon detecting a rotational engine speed of the engine exceeding an allowable rotational engine speed;

deceleration fuel cutting means for cutting the fuel supply upon detecting vehicle deceleration; and deceleration fuel cut prohibiting means for prohibiting the deceleration fuel cutting means from cutting the fuel supply to the engine during the vehicle deceleration for a prescribed period of time after operation of the fuel cutting means, wherein the deceleration fuel cut prohibiting means is configured to only prohibit cutting of the fuel supply during the vehicle deceleration when an amount of time over which the fuel cutting means operated is greater than or equal to a prescribed value.

17. An engine control apparatus comprising:

fuel cutting means for cutting a fuel supply to an engine upon detecting a vehicle speed exceeding an allowable vehicle speed;

deceleration fuel cutting means for cutting the fuel supply upon detecting vehicle deceleration; and deceleration fuel cut prohibiting means for prohibiting the deceleration fuel cutting means from cutting the fuel supply to the engine during the vehicle deceleration for a prescribed period of time after operation of the fuel cutting means, wherein the deceleration fuel cut prohibiting means further including a function for only prohibiting cutting of the fuel supply during vehicle deceleration when an amount of time over which the fuel cutting means operated is greater than or equal to a prescribed value.

\* \* \* \* \*